United States Patent
Moon et al.

(10) Patent No.: US 10,199,696 B2
(45) Date of Patent: Feb. 5, 2019

(54) MODULE HOUSING OF UNIT MODULE HAVING HEAT DISSIPATION STRUCTURE AND BATTERY MODULE INCLUDING THE SAME

(71) Applicant: LG CHEM, LTD., Seoul (KR)

(72) Inventors: Jung Oh Moon, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 240 days.

(21) Appl. No.: 14/911,828

(22) PCT Filed: Aug. 18, 2014

(86) PCT No.: PCT/KR2014/007630
§ 371 (c)(1),
(2) Date: Feb. 12, 2016

(87) PCT Pub. No.: WO2015/030405
PCT Pub. Date: Mar. 5, 2015

(65) Prior Publication Data
US 2016/0197386 A1 Jul. 7, 2016

(30) Foreign Application Priority Data
Aug. 28, 2013 (KR) ........................ 10-2013-0102615

(51) Int. Cl.
*H01M 2/10* (2006.01)
*H01M 10/653* (2014.01)
(Continued)

(52) U.S. Cl.
CPC ....... *H01M 10/653* (2015.04); *H01M 2/1077* (2013.01); *H01M 10/613* (2015.04);
(Continued)

(58) Field of Classification Search
CPC ............ H01M 10/653; H01M 10/613; H01M 10/625; H01M 10/647; H01M 2/1077; H01M 2220/20
See application file for complete search history.

(56) References Cited

U.S. PATENT DOCUMENTS 3,919,371 A * 11/1975 Jache ...................... B29C 45/14
264/262
3,963,521 A * 6/1976 Jache ...................... H01M 2/06
429/160
(Continued)

FOREIGN PATENT DOCUMENTS

JP 2002-304974 A 10/2002
JP 3940342 B2 7/2007
(Continued)

OTHER PUBLICATIONS

International Search Report issued in PCT/KR2014/007630 dated Dec. 15, 2014.
(Continued)

*Primary Examiner* — Stewart A Fraser
(74) *Attorney, Agent, or Firm* — Birch, Stewart, Kolasch & Birch, LLP

(57) ABSTRACT

Disclosed herein is a module housing of a unit module including battery cells, the module housing including a first cover member and a second cover member coupled to each other for covering entire outer surfaces of the battery cells, mounting grooves formed at an inside end of at least one of the first and second cover members such that the battery cells are mounted in the respective mounting grooves, and an injection port formed at the module housing such that a thermoplastic resin is injected to interfaces between the mounting grooves and the battery cells through the injection port in a state in which the battery cells are mounted in the module housing.

16 Claims, 2 Drawing Sheets

(51) Int. Cl.
*H01M 10/647* (2014.01)
*H01M 10/625* (2014.01)
*H01M 10/613* (2014.01)

(52) U.S. Cl.
CPC ....... *H01M 10/625* (2015.04); *H01M 10/647* (2015.04); *H01M 2220/20* (2013.01)

(56) References Cited

U.S. PATENT DOCUMENTS

| | | | |
|---|---|---|---|
| 2003/0215702 | A1 | 11/2003 | Tanjou et al. |
| 2006/0127756 | A1* | 6/2006 | Seo ..................... H01M 2/021 |
| | | | 429/175 |
| 2011/0090614 | A1 | 4/2011 | Guerin et al. |
| 2012/0121965 | A1* | 5/2012 | Makino .................. H01M 2/22 |
| | | | 429/156 |

FOREIGN PATENT DOCUMENTS

| | | |
|---|---|---|
| JP | 2013-037794 A | 2/2013 |
| KR | 10-2010-0100943 A | 9/2010 |
| WO | WO 2011/061931 A1 | 9/2010 |

OTHER PUBLICATIONS

Written Opinion of the International Searching Authority issued in PCT/KR2014/007630 dated Dec. 15, 2014.

\* cited by examiner

[FIG. 1]
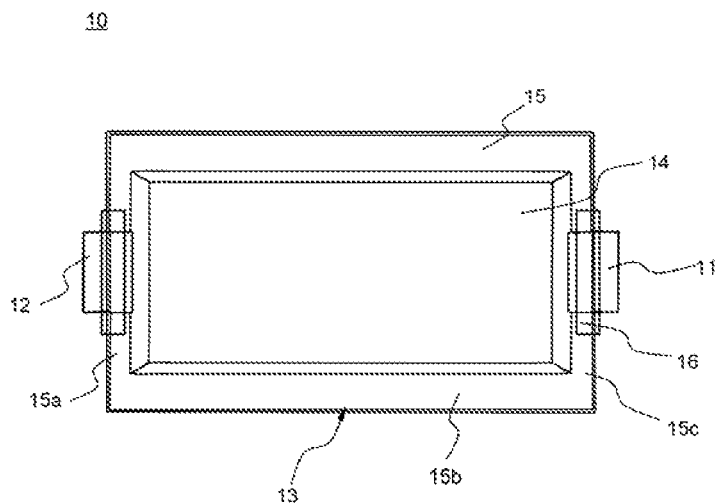
[FIG. 2]
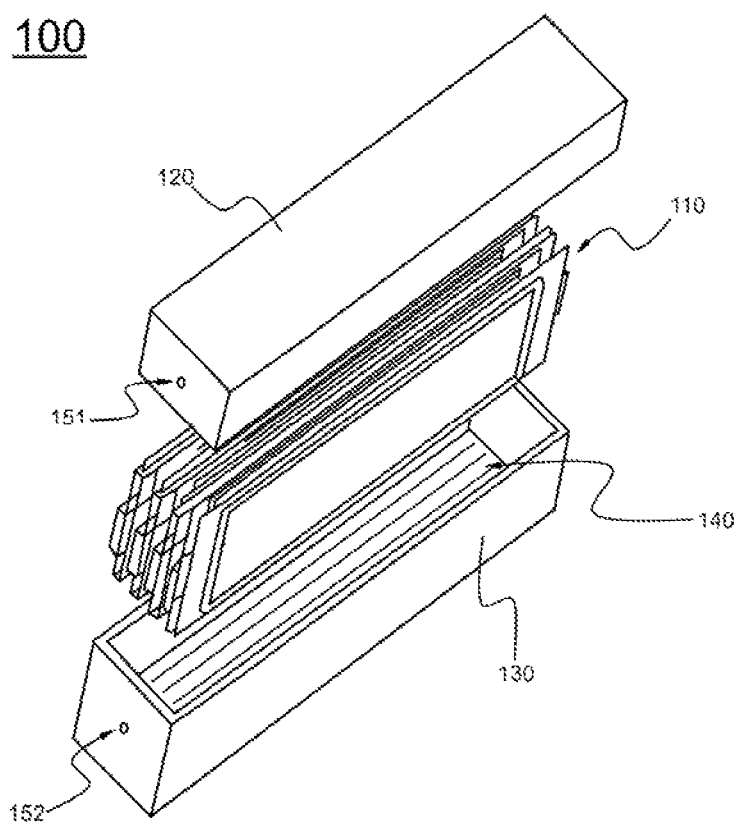

[FIG. 3]
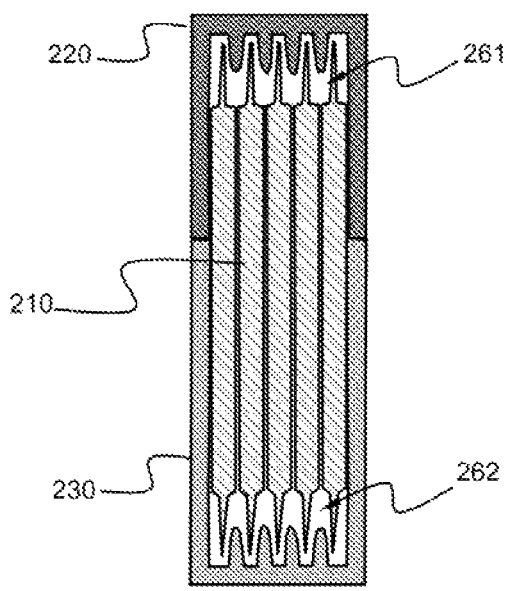

MODULE HOUSING OF UNIT MODULE HAVING HEAT DISSIPATION STRUCTURE AND BATTERY MODULE INCLUDING THE SAME

TECHNICAL FIELD

The present invention relates to a module housing of a unit module having a heat dissipation structure and a battery module including the same, and more particularly to a module housing of a unit module including battery cells, the module housing including a first cover member and a second cover member coupled to each other for covering entire outer surfaces of the battery cells, mounting grooves formed at an inside end of at least one of the first and second cover members such that the battery cells are mounted in the respective mounting grooves, and an injection port formed at the module housing such that a thermoplastic resin is injected to interfaces between the mounting grooves and the battery cells through the injection port in a state in which the battery cells are mounted in the module housing.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member (battery case), because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-output, large-capacity secondary batteries during the charge and discharge of the secondary batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a middle or large-sized battery pack for vehicles, which is a high-output, large-capacity battery including a plurality of middle or large-sized battery modules, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during the charge and discharge of the battery cells is removed. For example, the battery cells may be sequentially stacked in a state in which the battery cells are arranged al predetermined intervals without using an additional member. Alternatively, in a case in which the battery cells have low mechanical strength, one or more battery cells may be mounted in a cartridge to constitute a unit module, and a plurality of unit modules may be stacked to constitute a battery module. Consequently, the mechanical strength of the battery module is increased through the use of the cartridges, but the total size of the battery module is increased.

Additionally, in the above structure, coolant channels may be defined between the stacked battery cells or between the stacked battery modules such that heat accumulating between the stacked battery cells or between the stacked battery modules is effectively removed.

Particularly, in a case in which the cooling structure is based on a water cooling type cooling system, a plurality of coolant channels is defined between the battery cells or between the battery modules with the result that it is very difficult to design the cooling structure. In addition, if a cooling member or a heat conduction member is mounted to a specific region of the batter pack to constitute the cooling structure, the overall size of the battery pack is further increased.

Consequently, there is a high necessity for a battery pack in which battery cells are mounted without using a cartridge, which provides high-output, large-capacity electricity, which can be manufactured to have a simple and compact structure, and which exhibits excellent cooling efficiency and safety.

DISCLOSURE

Technical Problem

Therefore, the present invention has been made to solve the above problems, and other technical problems that have yet to be resolved.

It is an object of the present invention to provide a module housing of a unit module configured to cover the outer surfaces of battery cells, wherein heat generated from the battery cells is conducted to cover members of the module housing such that the battery cells are cooled, thereby achieving desired cooling efficiency without using an additional member, such as a thermal conduction member or a cooling member, and wherein a degree of freedom in cooling directions is increased by the cover members, which are made of the same material, covering the outer surfaces of the battery cells, thereby achieving an effective heat dissipation effect.

It is another object of the present invention to provide a battery module configured such that heat generated from battery cells is dissipated without using a large number of members, thereby achieving an effective cooling effect, overall manufacturing cost of the battery module is reduced, and the battery module is easily manufactured.

Technical Solution

In accordance with one aspect of the present invention, the above and other objects can be accomplished by the provision of a module housing of a unit module including battery cells, the module housing including a first cover member and a second cover member coupled to each other for covering entire outer surfaces of the battery cells, mounting grooves formed at an inside end of at least one of the first and second cover members such that the battery cells are mounted in the respective mounting grooves, and an injection port formed at the module housing such that a thermoplastic resin is injected to interfaces between the mounting grooves and the battery cells through the injection port in a state in which the battery cells are mounted in the module housing.

The cover members are configured to cover the outer surfaces of the battery cells, and heat generated from the battery cells is conducted to the cover members such that the battery cells are cooled. Consequently, it is possible to achieve desired cooling efficiency without using an additional member, such as a thermal conduction member or a cooling member. In addition, a degree of freedom in cooling directions is increased by the cover members, which are made of the same material, covering the outer surfaces of the battery cells, thereby achieving an effective heat dissipation effect.

In a preferred example, at least one of the first and second cover members may have a thermal conductivity of 10 W/mK to 500 W/mK. If the thermal conductivity is too low, it is not possible to achieve desired cooling efficiency, which is not preferable.

Specifically, at least one of the first and second cover members may be made of a thermally conductive resin. The thermally conductive resin may be a material having high thermal conductivity. For example, the thermally conductive resin may be a composite material including a polymer resin and a thermally conductive material or carbon fiber added thereto. However, the present invention is not limited thereto.

According to the present invention, each of the battery cells may be a pouch-shaped secondary battery configured to have a structure in which an electrode assembly is mounted in a receiving part of a pouch-shaped battery case made of a laminate sheet, such as an aluminum laminate sheet, including a metal layer and a resin layer.

In a concrete example, the battery case may be provided at the outer edge thereof with a sealed portion (an outer edge sealed portion), which is formed by sealing the outer edge of the battery case in a state in which the electrode assembly is mounted in the receiving part of the battery case.

In the above structure, the mounting grooves, formed at the at least one of the cover members, each may have a shape corresponding to the shape of the outer edge sealed portion of a corresponding one of the battery cells such that each of the battery cells is mounted in the module housing in a state in which the outer edge sealed portion is inserted in a corresponding one of the mounting grooves.

In accordance with another aspect of the present invention, there is provided a unit module including a battery cell stack, the outer surface of which is covered by the module housing with the above-stated construction.

In a concrete example, the unit module is configured to have a structure in which a thermoplastic resin is injected to interfaces between mounting grooves of the module housing and battery cells. The thermoplastic resin may be injected in a liquid state, and may then be solidified.

In the above structure, the interfaces between the mounting grooves of the module housing and the battery cells may be completely filled with the thermoplastic resin, whereby it is possible to effectively prevent movement of the battery cells. Consequently, it is possible to maintain a structure in which the battery cells are stacked without using additional cartridges, in which the battery cells are mounted.

In addition, it is not necessary to perform a complicated process of accurately aligning the battery cells with the mounting grooves of the module housing. Furthermore, the solidified thermoplastic resin tightly contacts the battery cells, whereby it is possible to more effectively cool the battery cells through thermal conduction.

The thermoplastic resin may be a material having high thermal conductivity. For example, the thermoplastic resin may be selected from among a polyimide resin, a polyethylene resin, a polypropylene resin, a polybutylene resin, a polystyrene resin, a polyethylene terephthalate resin, a polycarbonate resin, and a polybutadiene resin. However, the present invention is not limited thereto.

In a concrete example, each of the battery cells constituting the battery cell stack may be configured to have a structure in which an electrode assembly, which is configured to have a structure in which a separator is interposed between a positive electrode and a negative electrode, is contained in a pouch-shaped battery case together with an electrolyte in a sealed state.

The electrode assembly is not particularly restricted so long as the electrode assembly is configured to have a structure in which a plurality of electrode tabs is connected to constitute a positive electrode and a negative electrode. For example, the electrode assembly may be configured to have a wound type structure, a stacked type structure, or a stacked/folded type structure. The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the applications are incorporated herein by reference.

The battery cell stack may be configured to have a structure in which electrode terminals of two or more battery cells, each of which is configured to have a structure in which the electrode terminals are formed at one side or opposite sides thereof, are connected in series to each other, and connection parts of the electrode terminals are bent and stacked such that the bent connection parts of the electrode terminals tightly contact each other For reference, a general lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives, may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may also function as the separator.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

In accordance with another aspect of the present invention, there is provided a battery pack configured to have a structure in which a plurality of unit modules with the above-stated construction is stacked in a state of being connected in series to each other. In accordance with a further aspect of the present invention, there is provided a device including the battery pack as a power source.

For example, the device may be used as an electric vehicle, a hybrid electric vehicle, a plug-in hybrid electric vehicle, or an energy storage system. However, the present invention is not limited thereto.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a plan view showing a plate-shaped battery cell according to an embodiment of the present invention;

FIG. 2 is a perspective view showing a unit module according to an embodiment of the present invention; and FIG. 3 is a sectional view showing a unit module according to another embodiment of the present invention.

BEST MODE

Now, preferred embodiments of the present invention will be described in detail with reference to the accompanying drawings. It should be noted, however, that the scope of the present invention is not limited by the illustrated embodiments.

FIG. 1 is a plan view typically showing a plate-shaped battery cell according to an embodiment of the present invention.

Referring to FIG. 1, a plate-shaped battery cell 10 is configured to have a structure in which two electrode leads 11 and 12 protrude from the upper end and the lower end of a battery case 13 in a state in which the electrode leads 11 and 12 are opposite to each other.

The battery case 13 includes upper and lower battery case parts, each of which is made of a laminate sheet including of a metal layer and a resin layer. In a state in which an electrode assembly (not shown) of a positive electrode/separator/negative electrode structure is mounted in an electrode assembly receiving part 14 that is defined in the battery case 13, opposite sides 15b, upper ends 15a, and lower ends 15c of the upper and lower battery case parts of the battery case 13, which are an outer edge of the electrode assembly receiving part 14, are bonded to each other in a sealed state by thermal bonding to form a sealed portion 15 at the battery case 13, whereby the battery cell 10 is manufactured.

The battery cell 10 is configured to have a structure in which the electrode leads 11 and 12 protrude from the upper ends 15a and the lower ends 15c of the upper and lower battery case parts of the battery case 13. The upper ends 15a and the lower ends 15c of the upper and lower battery case parts of the battery case 13 are thermally bonded to each other, in a state in which a film type sealing member 16 is interposed between the electrode terminals 11 and 12 and the battery case 13, in consideration of the thickness of the electrode leads 11 and 12 and the difference in material between the electrode leads 11 and 12 and the battery case 13, and, in addition, so as to increase sealability of the battery case 13.

FIG. 2 is a perspective view showing a unit module according to an embodiment of the present invention.

Referring to FIG. 2, a module housing of the unit module includes a first cover member 120 and a second cover member 130, which are coupled to each other for covering the entire outer surface of a battery cell stack 110 formed by stacking battery cells, each of which is configured to have a structure in which an electrode assembly (not shown), which is configured to have a structure in which a separator is interposed between a positive electrode and a negative electrode, is contained in a pouch-shaped battery case together with an electrolyte in a sealed state. The first cover member 120 and the second cover member 130 are made of a thermally conductive resin having a thermal conductivity of 30 W/mK. Mounting grooves 140, in which the battery cells of the battery cell stack 110 are mounted, are formed at inside ends of the first cover member 120 and the second cover member 130.

Injection ports 151 and 152, through which a thermoplastic resin is injected to interfaces between the mounting grooves 140 and the battery cells of the battery cell stack 110 in a state in which the battery cell stack 110 is mounted in the first cover member 120 and the second cover member 130, are formed at one side of the first cover member 120 and at one side of the second cover member 130, respectively.

That is, the unit module 100 is configured to have a structure in which the module housing including the cover members 120 and 130, which are made of a thermally conductive resin, covers the outer surface of the battery cell stack 110. Heat generated from the battery cell stack 110 is directly conducted to the cover members 120 and 130, which exhibit high thermal conductivity, whereby the battery cell stack 110 is cooled. Consequently, it is possible to achieve desired cooling efficiency without using an additional member, such as a thermal conduction member or a cooling member. In addition, a degree of freedom in cooling directions is increased by the cover members 120 and 130, which are made of the same material, covering the outer surface of the battery cell stack 110, thereby achieving an effective heat dissipation effect.

FIG. 3 is a sectional view showing a unit module according to another embodiment of the present invention.

Referring to FIG. 3, a module housing of a unit module 200 includes a first cover member 220 and a second cover member 230, which are coupled to each other for covering the entire outer surface of a battery cell stack 210. The first cover member 220 and the second cover member 230 are made of a thermally conductive resin having a thermal conductivity of 30 W/mK. Surplus spaces 261 and 262 are defined between the first cover member 220 and the battery cell stack 210 and between the second cover member 230 and the battery cell stack 210, respectively.

Injection ports (not shown), through which a thermoplastic resin is injected to interfaces between mounting grooves of the first cover member 220 and the second cover member 230 and battery cells in a state in which the battery cell stack 210 is mounted in the first cover member 220 and the second cover member 230, are formed at one side of the first cover member 220 and at one side of the second cover member 230. A thermoplastic resin, such as Thermelt861 produced by Bostic, is injected into the first cover member 220 and the second cover member 230 through the injection ports in a liquid state, and is then solidified. As a result, the unit module 200 is configured to have a structure in which the first cover member 220 and the second cover member 230 are completely fixed to the battery cell stack 210 such that the battery cell stack 210 is prevented from moving in the first cover member 220 and the second cover member 230.

In the unit module 200 with the above-stated construction, the surplus spaces 261 and 262, which are defined between the module housing and the battery cell stack, are completely filled with the thermoplastic resin, whereby it is possible to effectively prevent movement of the battery cell stack 210. In addition, it is not necessary to perform a complicated process of accurately aligning the battery cells of the battery cell stack 210 with the mounting grooves of the first cover member 220 and the second cover member 230, thereby improving production yield of the unit module 200 and efficiency in manufacturing process of the unit module.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

INDUSTRIAL APPLICABILITY

As is apparent from the above description, a module housing of a unit module according to the present invention is configured to cover the outer surfaces of the battery cells, and heat generated from the battery cells is conducted to cover members of the module housing such that the battery cells are cooled. Consequently, it is possible to achieve desired cooling efficiency without using an additional member, such as a thermal conduction member or a cooling member. In addition, a degree of freedom in cooling directions is increased by the cover members, which are made of the same material, covering the outer surfaces of the battery cells, thereby achieving an effective heat dissipation effect.

The invention claimed is:

1. A unit module comprising:
a battery cell stack having a plurality of battery cells; and
a module housing including:
a first cover member and a second cover member coupled to each other for covering entire outer surfaces of the battery cell stack;
mounting grooves formed in an inner surface of at least one of the first and second cover members such that the battery cells are mounted in the respective mounting grooves; and
an injection port formed in the module housing such that a thermoplastic resin is injected to interfaces between the mounting grooves and the battery cells through the injection port in a state in which the battery cells are mounted in the module housing.

2. The unit module according to claim 1, wherein a thermoplastic resin is injected to interfaces between mounting grooves of the module housing and battery cells.

3. The unit module according to claim 2, wherein the thermoplastic resin is injected in a liquid state, and is then solidified.

4. The unit module according to claim 3, wherein the thermoplastic resin is selected from among a polyimide resin, a polyethylene resin, a polypropylene resin, a polybutylene resin, a polystyrene resin, a polyethylene terephthalate resin, a polycarbonate resin, and a polybutadiene resin.

5. The unit module according to claim 2, wherein the electrode assembly is configured to have a wound type structure, a stacked type structure, or a stacked/folded type structure.

6. The unit module according to claim 1, wherein each of the battery cells is configured to have a structure in which an electrode assembly, which is configured to have a structure in which a separator is interposed between a positive electrode and a negative electrode, is contained in a pouch-shaped battery case together with an electrolyte in a sealed state.

7. The unit module according to claim 1, wherein the battery cell stack is configured to have a structure in which electrode terminals of two or more battery cells are connected in series to each other, and connection parts of the electrode terminals are bent.

8. A battery pack configured to have a structure in which a plurality of unit modules according to claim 7 is stacked in a state of being connected in series to each other.

9. A device comprising a battery pack according to claim 8 as a power source.

10. The device according to claim 9, wherein the device is an electric vehicle, a hybrid electric vehicle, a plug-in hybrid electric vehicle, or an energy storage system.

11. The unit module according to claim 1, wherein at least one of the first and second cover members has a thermal conductivity of 10 W/mK to 500 W/mK.

12. The unit module according to claim 1, wherein at least one of the first and second cover members is made of a thermally conductive resin.

13. The unit module according to claim 12, wherein the thermally conductive resin is a composite material comprising a polymer resin and a thermally conductive material or carbon fiber added thereto.

14. The unit module according to claim 1, wherein each of the battery cells is configured to have a structure in which an electrode assembly is mounted in a battery case made of a laminate sheet comprising a resin layer and a metal layer.

15. The unit module according to claim 14, wherein the battery case includes an outer edge sealed portion, which is formed by sealing an outer edge of the battery case in a state in which the electrode assembly is mounted in a receiving part of the battery case.

16. The unit module according to claim 15, wherein each of the mounting grooves has a shape corresponding to the shape of the outer edge sealed portion of a corresponding one of the battery cells such that each of the battery cells is mounted in the module housing in a state in which the outer edge sealed portion is inserted in a corresponding one of the mounting grooves.

* * * * *